(12) United States Patent
Katayama et al.

(10) Patent No.: US 11,536,628 B2
(45) Date of Patent: Dec. 27, 2022

(54) MISFIRE DETECTING DEVICE AND METHOD FOR INTERNAL COMBUSTION ENGINE

(71) Applicant: TOYOTA JIDOSHA KABUSHIKI KAISHA, Aichi-ken (JP)

(72) Inventors: Akihiro Katayama, Toyota (JP); Takumi Anzawa, Okazaki (JP); Yuki Ikejiri, Nishio (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/520,604

(22) Filed: Nov. 5, 2021

(65) Prior Publication Data
US 2022/0146375 A1 May 12, 2022

(30) Foreign Application Priority Data
Nov. 9, 2020 (JP) .............................. JP2020-186447

(51) Int. Cl.
*G01M 15/11* (2006.01)
*F02D 41/14* (2006.01)

(52) U.S. Cl.
CPC ......... *G01M 15/11* (2013.01); *F02D 41/1498* (2013.01); *F02D 2200/1015* (2013.01)

(58) Field of Classification Search
CPC ............... G01M 15/11; F02D 41/1498; F02D 2200/1015; F02D 35/023; F02D 2200/0812; F02D 41/029; F02D 41/0087; F02D 13/06; F02D 17/02; F02M 69/28

USPC ........ 73/114.02–114.11; 123/406.14, 406.27, 123/481, 198 F
See application file for complete search history.

(56) References Cited

U.S. PATENT DOCUMENTS

| | | | | |
|---|---|---|---|---|
| 4,930,479 A | * | 6/1990 | Osawa ................... | G01M 15/11 123/436 |
| 4,971,010 A | * | 11/1990 | Iwata ...................... | F02D 41/22 123/481 |
| 5,035,220 A | * | 7/1991 | Uchinami .............. | G01M 15/11 123/436 |

(Continued)

FOREIGN PATENT DOCUMENTS

| | | | |
|---|---|---|---|
| JP | H04265475 A | * | 9/1992 |
| JP | H7119532 A | | 5/1995 |

(Continued)

*Primary Examiner* — Sizo B Vilakazi
*Assistant Examiner* — Brian R Kirby
(74) *Attorney, Agent, or Firm* — Hauptman Ham, LLP

(57) ABSTRACT

Time required by a crankshaft to rotate 30° CA from a compression top dead center is defined as time T30. A CPU calculates a rotation fluctuation amount ΔT30 related to a cylinder subject to determination of a misfire by subtracting a value related to a cylinder in which a compression top dead center occurred immediately before the cylinder subject to the determination from a value related to the subject to the determination. The rotation fluctuation amount ΔT30 that corresponds to a cylinder in which a combustion operation is stopped is used as a reference value ΔT30ref. When a combustion operation is performed, it is determined that there is a misfire if the absolute value of the difference between the rotation fluctuation amount ΔT30 and the reference value ΔT30ref is less than or equal to a determination value Δth.

12 Claims, 8 Drawing Sheets

(56) References Cited

U.S. PATENT DOCUMENTS

| | | | | |
|---|---|---|---|---|
| 5,088,318 A * | 2/1992 | Osawa | F02B 77/08 | 73/114.04 |
| 5,127,262 A * | 7/1992 | Demizu | G01M 15/08 | 73/114.06 |
| 5,237,504 A * | 8/1993 | Holmes | G01M 15/11 | 701/111 |
| 5,442,955 A * | 8/1995 | Baba | G01M 15/11 | 340/439 |
| 5,485,374 A * | 1/1996 | Takaku | F02D 41/22 | 701/111 |
| 5,529,041 A * | 6/1996 | Andrews | F02D 41/22 | 123/436 |
| 5,648,602 A * | 7/1997 | Hoshina | G01M 15/11 | 73/114.22 |
| 5,728,941 A * | 3/1998 | Yamamoto | G01M 15/11 | 123/436 |
| 5,951,617 A * | 9/1999 | Shinohara | G01M 15/11 | 123/436 |
| 6,061,624 A * | 5/2000 | Kashimura | G01M 15/11 | 73/114.04 |
| 6,732,042 B2 * | 5/2004 | Katayama | G01M 15/11 | 123/406.13 |
| 7,188,023 B1 * | 3/2007 | O'Daniel | F02D 41/0087 | 701/111 |
| 7,503,207 B2 * | 3/2009 | Nishigaki | G01M 15/11 | 73/114.02 |
| 7,607,345 B2 * | 10/2009 | Katayama | G01M 15/11 | 123/436 |
| 8,200,415 B2 * | 6/2012 | Hagel | F02D 41/1497 | 123/481 |
| 9,399,963 B2 * | 7/2016 | Loucks | F02D 41/0087 | |
| 10,221,825 B2 * | 3/2019 | Ota | F02D 41/1497 | |
| 2005/0217356 A1 * | 10/2005 | Matsumoto | G01M 15/11 | 73/114.07 |
| 2007/0000456 A1 * | 1/2007 | Wong | F02D 19/105 | 123/27 GE |
| 2009/0049895 A1 * | 2/2009 | Huber | G01M 15/11 | 73/114.02 |
| 2014/0261317 A1 * | 9/2014 | Loucks | F02D 41/22 | 123/350 |
| 2015/0192498 A1 * | 7/2015 | Takahashi | G01M 15/11 | 73/114.04 |
| 2019/0234323 A1 * | 8/2019 | Weber | F01L 13/0036 | |

FOREIGN PATENT DOCUMENTS

| | | | |
|---|---|---|---|
| JP | 2009138663 A | | 6/2009 |
| JP | 2009174503 A | * | 8/2009 |
| JP | 2013047493 A | * | 3/2013 |
| JP | 2015129483 A | | 7/2015 |

* cited by examiner

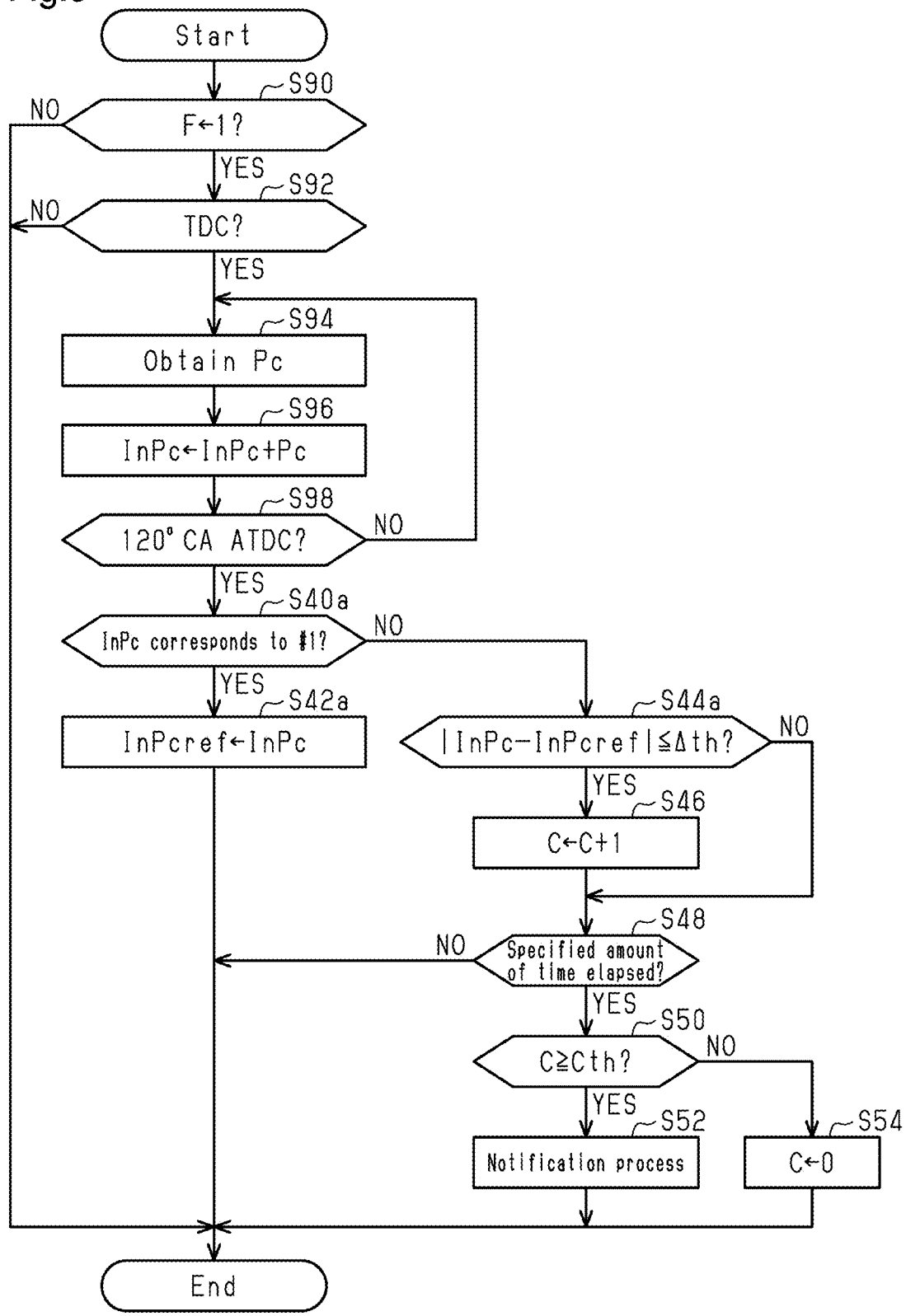

MISFIRE DETECTING DEVICE AND METHOD FOR INTERNAL COMBUSTION ENGINE

RELATED APPLICATIONS

The present application claims priority of Japanese Application Number 2020-186447 filed on Nov. 9, 2020, the disclosure of which is hereby incorporated by reference herein in its entirety.

BACKGROUND

1. Field

The present disclosure relates to a misfire detecting device and method for an internal combustion engine.

2. Description of Related Art

Japanese Laid-Open Patent Publication No. 2009-138663 discloses a device that determines whether there is a misfire based on a rotation fluctuation amount of a crankshaft. The device defines the rotation fluctuation amount using the difference between a rotation speed of the crankshaft at a combustion stroke of a cylinder subject to the determination and a rotation speed of the crankshaft at the preceding combustion stroke. The device determines that a misfire is occurring when the difference between the rotation fluctuation amount related to the cylinder subject to the determination and the rotation fluctuation amount that is 360° CA earlier exceeds a threshold.

The inventor considered employing a configuration of an internal combustion engine that supplies, when the shaft torque of the engine is not zero, unburned fuel and oxygen to exhaust gas by stopping combustion operation in some of the cylinders and causing the air-fuel ratio in the remaining cylinders to be the stoichiometric air-fuel ratio, in order to perform a regeneration process for an exhaust gas aftertreatment device. In this configuration, the rotation fluctuation amount that is 360° CA earlier may be calculated using a rotation speed that corresponds to the cylinders in which the combustion operation is stopped. This can cause erroneous determination of a misfire.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, a misfire detecting device for an internal combustion engine is provided. The internal combustion engine includes cylinders. The misfire detecting device being configured to execute: a stopping process that stops a combustion operation for air-fuel mixture in one or some of the cylinders; a combustion variable obtaining process that obtains values of a combustion variable, the combustion variable being determined by a detected value of a sensor that detects physical quantities corresponding to combustion states of air-fuel mixture in the respective cylinders, and the combustion variable representing the combustion state in each of the respective cylinder; and a determination process. When the stopping process is executed, the determination process defines the cylinder in which the combustion operation is performed as a cylinder subject to determination as whether there is a misfire. Also, the determination process determines that a misfire has occurred in the cylinder subject to the determination when a degree of deviation of the value of the combustion variable of the cylinder subject to the determination in relation to the value of the combustion variable of the cylinder subject to the stopping process is less than or equal to a specified value.

The value of the combustion variable of the cylinder in which the stopping process has been executed is equivalent to the value of the combustion variable of the cylinder in which a misfire has occurred despite the execution of the combustion operation. Thus, the above-described configuration uses, as a reference value, the value of the combustion variable in the cylinder subject to the stopping process. It is determined that a misfire has occurred when the degree of deviation between the value of the combustion variable of the cylinder subject to the determination and the reference value is relatively small. This allows the determination process for determining whether there is a misfire to be properly executed even during the execution of the stopping process.

In the above-described misfire detecting device, the sensor is preferably a crank angle sensor. The combustion variable is preferably a rotation fluctuation amount of a crankshaft of the internal combustion engine. The rotation fluctuation amount is preferably a variable related to a difference in magnitude of instantaneous speed variables. The instantaneous speed variables preferably each represent a rotation speed of the crankshaft within an angular interval less than or equal to an interval between occurrences of a compression top dead center of the internal combustion engine. The instantaneous speed variables corresponding to the rotation fluctuation amount of a specific cylinder of the cylinders preferably include an instantaneous speed variable in a period between a compression top dead center of the specific cylinder and a subsequent compression top dead center.

The rotation behavior of the crankshaft in a period between a compression top dead center of the specific cylinder and the subsequent compression top dead center is strongly correlated with whether there is a misfire in the specific cylinder. Therefore, if the rotation fluctuation amount related to the specific cylinder includes the instantaneous speed variable related to that period, the rotation fluctuation amount can be used as a value that highly accurately represents whether there is a misfire in the specific cylinder.

In the above-described misfire detecting device, the determination process is preferably configured to determine that a misfire has occurred in the cylinder subject to the determination when a deviation amount of the rotation fluctuation amount of the cylinder subject to the determination in relation to the rotation fluctuation amount of the cylinder subject to the stopping process is less than or equal to a defined amount that is defined previously. The defined amount is preferably a fixed value.

The rotation fluctuation amount, which corresponds to whether there is a misfire, changes in correspondence with the rotation speed of the crankshaft and the load on the internal combustion engine. On the other hand, the rotation fluctuation amount related to the cylinder subject to the stopping process corresponds to the rotation speed of the crankshaft and the load on the internal combustion engine. Thus, the above-described configuration uses the rotation fluctuation amount related to the cylinder subject to the stopping process as a reference value, and determines that there is a misfire when the deviation amount between the reference value and the rotation fluctuation amount related to the cylinder in which the combustion operation is performed is less than or equal to the defined amount, which is a fixed value. This reduces the number of adaptation steps related to the process for determining whether there is a misfire.

In the above-described misfire detecting device, the misfire detecting device is preferably configured to execute the stopping process on a condition that the rotation speed of the crankshaft of the internal combustion engine is greater than or equal to a defined speed.

The rotational energy of the crankshaft is proportionate to the square of the rotation speed. Accordingly, the rate of change of the rotation speed in relation to the amount of energy supplied to the crankshaft is higher when the rotation speed is relatively low than when the rotation speed is relatively high. Thus, in a low rotation speed region, if a misfire occurs in a cylinder in which the compression top dead center occurs subsequent to the cylinder subject to the stopping process, a drop in the rotation speed may be greater than that caused by the cylinder subject to the stopping process. In this regard, the above-described configuration executes the stopping process on condition that the rotation speed is greater than or equal to the defined speed. This reduces a possible difference between the rotation fluctuation amount related to the cylinder subject to the stopping process and the rotation fluctuation amount related to the cylinder in which the combustion operation is performed. Thus, even though the defined amount is a fixed value, the above-described configuration determines whether there is a misfire with a high accuracy.

The above-described misfire detecting device is preferably configured to execute the stopping process on a condition that a torque of the internal combustion engine is greater than or equal to a defined value.

The reduction in the accuracy of the misfire determination due to the influence of tolerances of the crank angle sensor is smaller when the torque of the internal combustion engine is relatively high than when the torque is relatively low. In this regard, the present disclosure executes the stopping process when the torque is greater than or equal to the defined value. This reduces the difference in the influence of tolerances between the rotation fluctuation amount related to the cylinder subject to the stopping process and the rotation fluctuation amount related to the cylinder subject to the determination as to whether there is a misfire. It is thus possible to determine whether there is a misfire with a high accuracy.

The above-described misfire detecting device is preferably configured to execute a learning process that learns a difference between: a rotation fluctuation amount in a case in which the combustion operation of the internal combustion engine is stopped in a cylinder of which an interval of an occurrence of the compression top dead center from an occurrence of the compression top dead center of the cylinder subject to the stopping process is not an integral multiple of one revolution; and the rotation fluctuation amount of the cylinder subject to the stopping process. The determination process preferably includes a correction process that: determines that a misfire has occurred in the cylinder subject to the determination when a deviation amount of the rotation fluctuation amount of the cylinder subject to the determination in relation to the rotation fluctuation amount of the cylinder subject to the stopping process is less than or equal to a defined amount that is defined previously; and defines, in accordance with the difference learned by the learning process, the defined value for a case in which the determination is performed on the cylinder of which the interval is not an integral multiple of one revolution.

The rotation fluctuation amount includes the influence of tolerances of the signal that is input to the calculating process of the rotation fluctuation amount. The influence of tolerances on the rotation fluctuation amount related to the cylinder that has a compression top dead center separated, by an angular interval corresponding to an integral multiple of one revolution, from the compression top dead center of the cylinder subject to the stopping process, is equivalent to the influence of tolerances on the rotation fluctuation amount related to the cylinder subject to the stopping process. In contrast, the influence of tolerances on the rotation fluctuation amount related to the cylinder that has a compression top dead center separated, by an angular interval that is not an integral multiple of one revolution, from the cylinder subject to the stopping process, may be significantly different from the influence of tolerances on the rotation fluctuation amount related to the cylinder subject to the stopping process.

In this regard, the above-described configuration executes the learning process to learn the difference and determines, in accordance with the difference, the defined amount, which is used when the misfire determination is performed for the cylinder of which the compression top dead center is separated, by an angular interval that is not an integral multiple of one revolution, from the cylinder subject to the stopping process. This prevents the accuracy of the misfire determination from being reduced by the influence of tolerances.

In the above-described misfire detecting device, the sensor preferably includes sensors that are respectively provided in combustion chambers of the cylinders to detect combustion states of air-fuel mixture in the combustion chambers. The combustion variable related to each of the cylinders preferably includes a variable that is quantified using detected values of the sensors in a period from a compression top dead center to a subsequent compression top dead center in the cylinders.

The combustion stroke of a specific cylinder is equivalent to a period from a compression top dead center of the specific cylinder to the subsequent compression top dead center of the specific cylinder. Thus, the use of the detected value of the sensor of that period allows the combustion state during the combustion stroke to be quantified. Accordingly, the above-described configuration is capable of using the combustion variable as a value that highly accurately represents whether there is a misfire in the specific cylinder.

In the above-described misfire detecting device, the sensors preferably include sensors that detect pressure in the combustion chambers.

The pressure in the combustion chamber is higher when air-fuel mixture is burned during the combustion stroke than when air-fuel mixture is not burned. Thus, the pressure in the combustion chamber is an appropriate variable that represents the combustion state of the air-fuel mixture in the combustion chamber. Therefore, in the above-described configuration, the quantification of the combustion variable using the pressure in the combustion chamber allows the combustion variable to be used as a value that highly accurately represents whether there is a misfire in the specific cylinder.

In a second general aspect, a misfire detecting device for an internal combustion engine is provided. The internal combustion engine includes cylinders. The misfire detecting device includes circuitry. The circuitry is configured to execute: a stopping process that stops a combustion operation for air-fuel mixture in one or some of the cylinders; a combustion variable obtaining process that obtains values of a combustion variable, the combustion variable being determined by a detected value of a sensor that detects physical quantities corresponding to combustion states of air-fuel mixture in the respective cylinders, and the combustion variable representing the combustion state in each of the respective cylinder; and a determination process. When the stopping process is executed, the determination process defines the cylinder in which the combustion operation is performed as a cylinder subject to determination as whether there is a misfire. Also, the determination process determines that a misfire has occurred in the cylinder subject to the determination when a degree of deviation of the value of the combustion variable of the cylinder subject to the determination in relation to the value of the combustion variable of the cylinder subject to the stopping process is less than or equal to a specified value.

In a third general aspect, a misfire detecting method for an internal combustion engine is provided. The internal combustion engine includes cylinders. The misfire detecting method includes: stopping a combustion operation for air-fuel mixture in one or some of the cylinders; obtaining values of a combustion variable, the combustion variable being determined by a detected value of a sensor that detects physical quantities corresponding to combustion states of air-fuel mixture in the respective cylinders, and the combustion variable representing the combustion state in each of the respective cylinder; and determining. The determining includes: when the stopping process is executed, defining the cylinder in which the combustion operation is performed as a cylinder subject to determination as whether there is a misfire; and determining that a misfire has occurred in the cylinder subject to the determination when a degree of deviation of the value of the combustion variable of the cylinder subject to the determination in relation to the value of the combustion variable of the cylinder subject to the stopping process is less than or equal to a specified value.

Other features and aspects will be apparent from the following detailed description, the drawings, and the claims.

BRIEF DESCRIPTION OF THE DRAWINGS

FIG. 9 is a flowchart showing a procedure of processes executed by the controller.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment will now be described with reference to the drawings.

Figure 1:
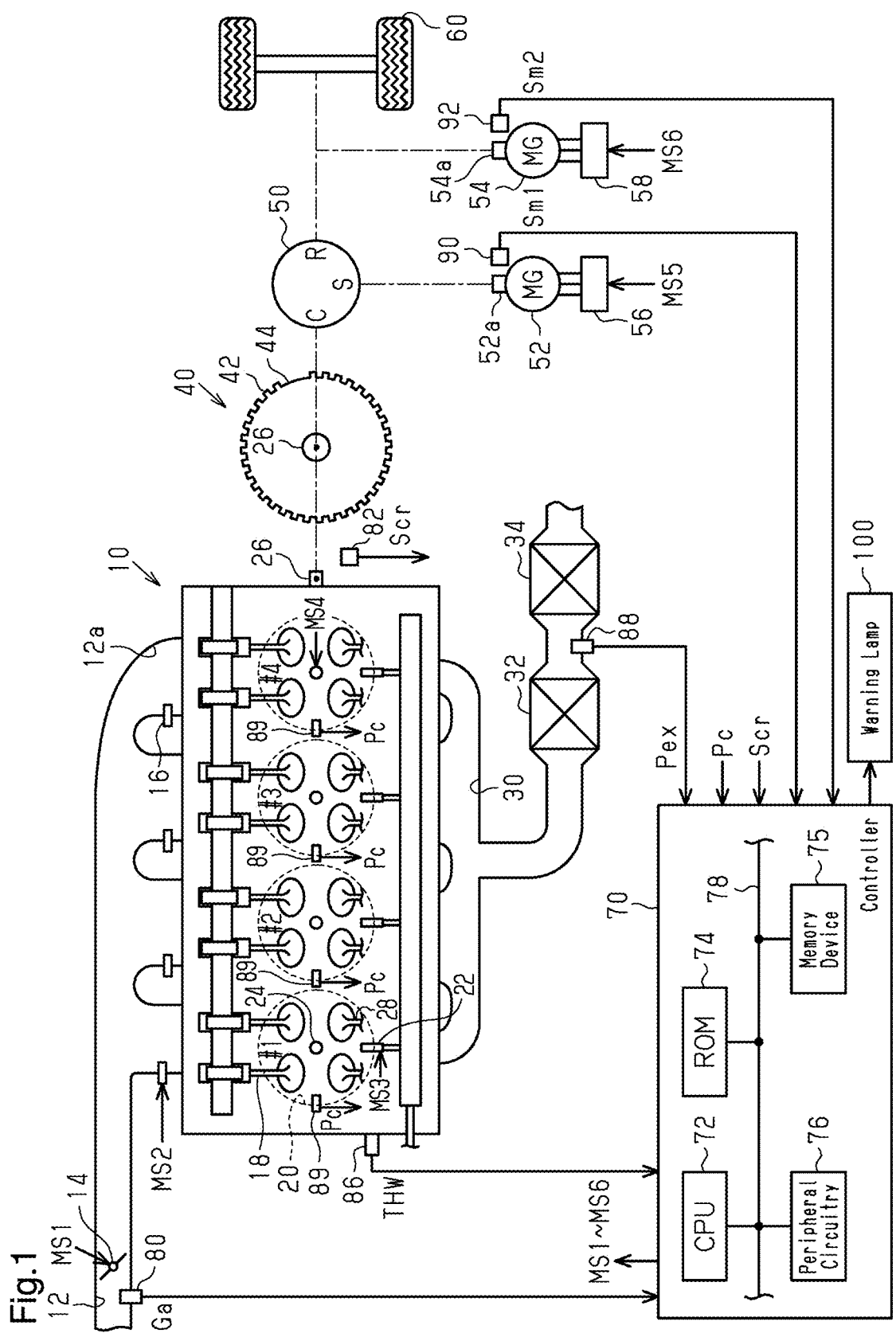
FIG. 1 is a diagram showing the configuration of a drivetrain and a controller according to a first embodiment.

As shown in FIG. 1, an internal combustion engine 10 includes four cylinders #1 to #4. An intake passage 12 of the internal combustion engine 10 incorporates a throttle valve 14. The intake passage 12 includes intake ports 12a in a downstream section. Each intake port 12a is provided with a port injection valve 16, which injects fuel into the intake port 12a. Air drawn into the intake passage 12 and fuel injected from the port injection valves 16 flow into combustion chambers 20 when intake valves 18 are opened. A direct injection valve 22 injects fuel into each combustion chamber 20. Air-fuel mixture in the combustion chamber 20 is burned by spark discharge of an ignition plug 24. This generates combustion energy, which is in turn converted into rotational energy of a crankshaft 26.

The air-fuel mixture burned in the combustion chambers 20 is discharged to an exhaust passage 30 as exhaust gas when exhaust valves 28 are opened. The exhaust passage 30 is provided with a three-way catalyst 32, which has an oxygen storage capacity, and a gasoline particulate filter (GPF) 34. The GPF 34 includes a filter that traps particulate matter (PM) and supports a three-way catalyst.

A crank rotor 40 having teeth 42 is coupled to the crankshaft 26. The teeth 42 indicate respective rotation angles of the crankshaft 26. The teeth 42 are generally arranged at 10° CA intervals on the crank rotor 40. The crank rotor 40 also has a toothless section 44, at which the interval between the adjacent teeth 42 is 30° CA. The toothless section 44 are designed to indicate a referential rotation angle of the crankshaft 26.

The crankshaft 26 is mechanically coupled to a carrier C of a planetary gear mechanism 50, which is part of a power splitter. The planetary gear mechanism 50 includes a sun gear S, which is mechanically coupled to a rotary shaft 52a of a first motor-generator 52. The planetary gear mechanism 50 includes a ring gear R, which is mechanically coupled to a rotary shaft 54a of a second motor-generator 54 and to driven wheels 60. Alternating-current voltage of an inverter 56 is applied to terminals of the first motor-generator 52. Also, alternating-current voltage of an inverter 58 is applied to terminals of the second motor-generator 54.

A controller 70 controls the internal combustion engine 10 and operates operated units of the internal combustion engine 10, such as the throttle valve 14, the port injection valves 16, the direct injection valves 22, and the ignition plugs 24, thereby controlling torque and the ratios of exhaust components, which are controlled variables. Also, the controller 70 controls the first motor-generator 52. Specifically, the controller 70 operates the inverter 56, thereby controlling the rotation speed, which is a controlled variable, of the first motor-generator 52. Further, the controller 70 controls the second motor-generator 54. Specifically, the controller 70 operates the inverter 58, thereby controlling torque, which is a controlled variable, of the second motor-generator 54. FIG. 1 shows operation signals MS1 to MS6 respectively corresponding to the throttle valve 14, the port injection valves 16, the direct injection valves 22, the ignition plugs 24, and the inverters 56, 58. To control controlled variables of the internal combustion engine 10, the controller 70 refers to an intake air amount Ga detected by an air flow meter 80, an output signal Scr of a crank angle sensor 82, a coolant temperature THW detected by a coolant temperature sensor 86, and a pressure Pex of exhaust gas flowing into the GPF 34 detected by an exhaust pressure sensor 88. Also, the controller 70 refers to an in-cylinder pressure Pc detected by an in-cylinder pressure sensor 89, which is provided in the combustion chamber 20 of each of the cylinders #1 to #4. Further, to control controlled variables of the first motor-generator 52 and the second motor-generator 54, the controller 70 refers to an output signal Sm1 of a first rotation angle sensor 90, which detects a rotation angle of the first motor-generator 52, and an output signal Sm2 of a second rotation angle sensor 92, which detects a rotation angle of the second motor-generator 54.

The controller 70 includes a central processing unit (CPU) 72, a read-only memory (ROM) 74, a memory device 75, and peripheral circuitry 76, which can communicate with each other through a communication line 78. The peripheral circuitry 76 includes a circuit that generates a clock signal regulating internal operations, a power supply circuit, and a reset circuit. The controller 70 controls the controlled variables by causing the CPU 72 to execute programs stored in the ROM 74.

Figure 2:
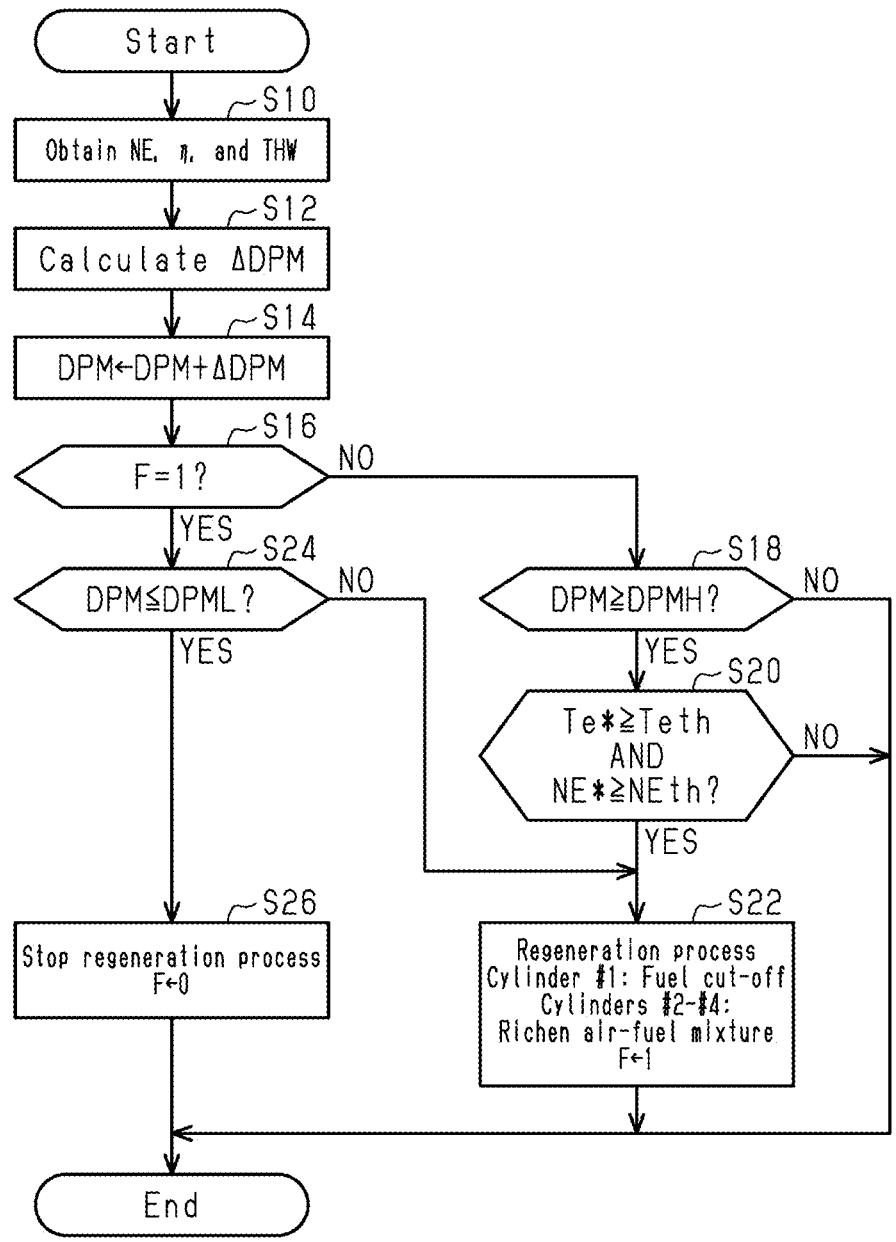
FIG. 2 is a flowchart showing a procedure of processes executed by the controller.

FIG. 2 shows a procedure of processes executed by the controller 70 according to the first embodiment. The process shown in FIG. 2 is implemented by the CPU 72 repeatedly executing programs stored in the ROM 74 at specified intervals. In the following description, the number of each step is represented by the letter S followed by a numeral.

In the series of processes shown in FIG. 2, the CPU 72 first obtains a rotation speed NE, a charging efficiency η, and the coolant temperature THW (S10). The rotation speed NE is calculated by the CPU 72 based on the output signal Scr. The charging efficiency 11 is calculated by the CPU 72 based on the intake air amount Ga and the rotation speed NE. Next, the CPU 72 calculates an update amount ΔDPM of the accumulated amount DPM based on the rotation speed NE, the charging efficiency η, and the coolant temperature THW (S12). The accumulated amount DPM is the amount of PM trapped by the GPF 34. Specifically, the CPU 72 first calculates the amount of PM in the exhaust gas discharged to the exhaust passage 30 based on the rotation speed NE, the charging efficiency η, and the coolant temperature THW. Also, the CPU 72 calculates the temperature of the GPF 34 based on the rotation speed NE and the charging efficiency η. Further, the CPU 72 calculates the update amount ΔDPM based on the amount of PM in the exhaust gas and the temperature of the GPF 34.

The CPU 72 updates the accumulated amount DPM in accordance with update amount ΔDPM (S14). Subsequently, the CPU 72 determines whether a flag F is 1 (S16). The value 1 of the flag F indicates that a regeneration process for burning and removing the PM in the GPF 34 is being executed, and the value 0 of the flag F indicates that the regeneration process is not being executed. When determining that the flag F is 0 (S16: NO), the CPU 72 determines whether the accumulated amount DPM is greater than or equal to a regeneration execution value DPMH (S18). The regeneration execution value DPMH indicates the amount of PM trapped by the GPF 34 has increased, and is set to a value at which removal of PM is desirable. When determining that the accumulated amount DPM is greater than or equal to the regeneration execution value DPMH (S18: YES), the CPU 72 determines whether the logical conjunction of a condition (1) and a condition (2), which are shown below, is true (S20). This process is configured to determine whether the execution of the regeneration process is permitted.

Condition (1) A condition that an engine requested torque Te*, which is torque that the internal combustion engine 10 is requested to produce, is greater than or equal to a defined value Teth.

Condition (2) A condition that the rotation speed NE is greater than or equal to a defined speed NEth.

When the logical conjunction is true (S20: YES), the CPU 72 executes the regeneration process and assigns 1 to the flag F (S22). That is, the CPU 72 stops fuel injection from the port injection valve 16 and the direct injection valve 22 of the cylinder #1, and causes the air-fuel ratio of the air-fuel mixture in the combustion chambers 20 of the cylinders #2 to #4 to be richer than the stoichiometric air-fuel ratio. This process discharges oxygen and unburned fuel to the exhaust passage 30, so that the temperature of the GPF 34 is increased. Accordingly, the PM trapped by the GPF 34 is burned and removed. That is, oxygen and unburned fuel are discharged to the exhaust passage 30, so as to burn the unburned fuel in the three-way catalyst 32 and the like to increase the temperature of the exhaust gas. Accordingly, the temperature of the GPF 34 is increased. Also, oxygen is supplied to the GPF 34, so that PM trapped by the GPF 34 is burned and removed.

When the flag F is 1 in the process (S16: YES), the CPU 72 determines whether the accumulated amount DPM is less than or equal to a stopping threshold DPML (S24). The stopping threshold DPML is set to a value that indicates that the amount of PM trapped in the GPF 34 has been reduced to a sufficiently low level that allows the regeneration process to be stopped. When the accumulated amount DPM exceeds the stopping threshold DPML (S24: NO), the CPU 72 advances the process to S22. When the accumulated amount DPM is less than or equal to the stopping threshold DPML (S24: YES), the CPU 72 stops the regeneration process and assigns 0 to the flag F (S26).

When completing the process of S22 or S26, or when making a negative determination in the process of S18 or S20, the CPU 72 temporarily suspends the series of processes shown in FIG. 2.

Figure 3:
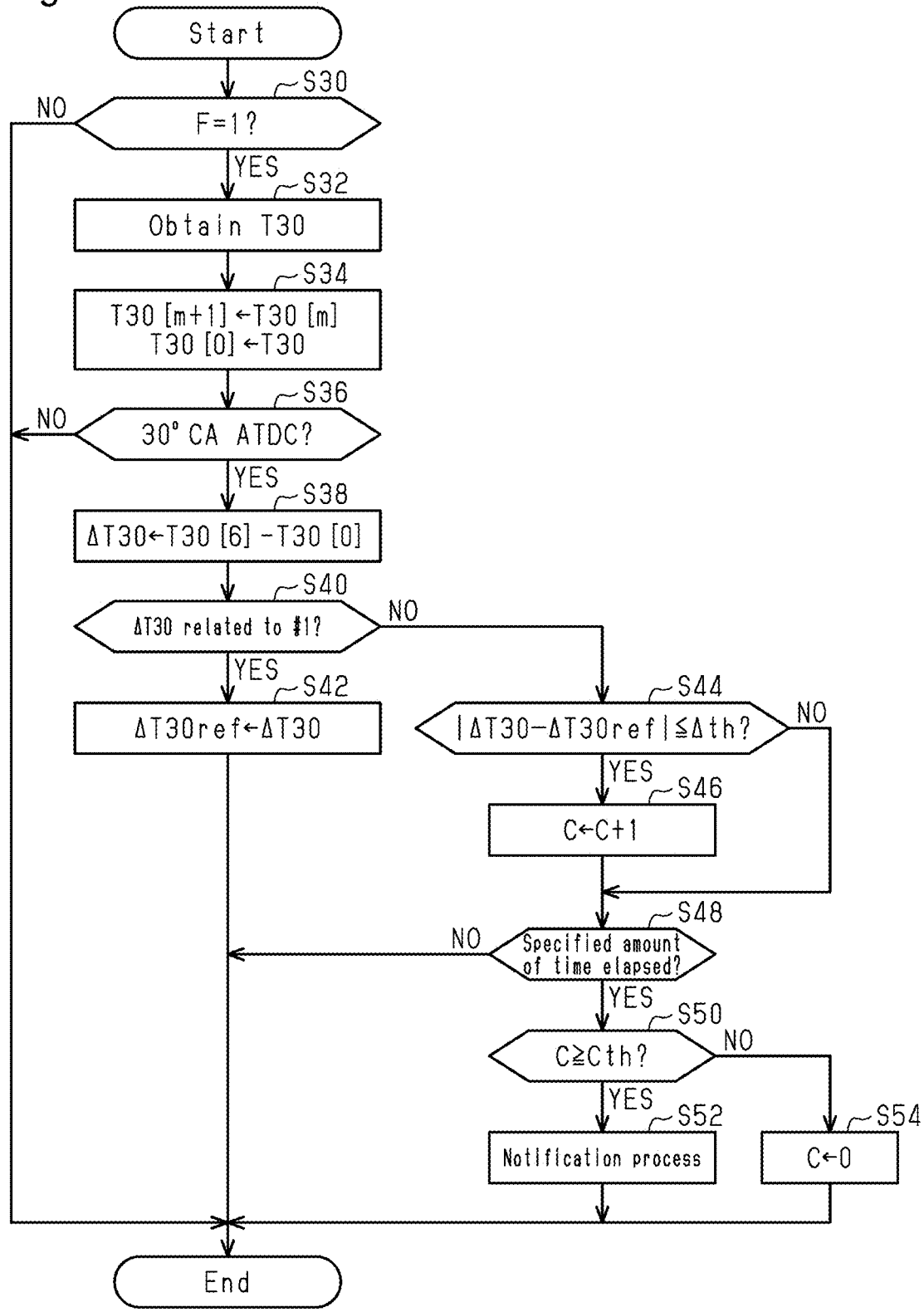
FIG. 3 is a flowchart showing a procedure of processes executed by the controller.

FIG. 3 shows another procedure of processes executed by the controller 70. The process shown in FIG. 3 is implemented by the CPU 72 repeatedly executing programs stored in the ROM 74 at specified intervals.

In the series of processes shown in FIG. 3, the CPU 72 first determines whether the flag F is 1 (S30). If the flag F is 1 (S30: YES), the CPU 72 obtains time T30, which is an amount of time required by the crankshaft 26 to rotate 30° CA (S32). That is, the CPU 72 calculates the time T30 by measuring an amount of time in which a tooth 42 of the crank rotor 40 that is detected by the crank angle sensor 82 is shifted to another tooth 42 that is separated from the first tooth 42 by 30° CA. Next, the CPU 72 substitutes time T30[$m$] for time T30[$m$+1] ($m$=0, 1, 2, 3 . . . ), and substitutes, for time T30[0], the time T30 that has been newly obtained in the process of S32 (S34). Accordingly, the number in the bracket following the time T30 has a value that is incremented by 1 for each regression of the execution of the process. When two values of T30 are compared, and the variable in the bracket of one of the compared values is greater than that of the other by 1, the former precedes the latter by 30° CA.

Next, the CPU 72 determines whether the current rotation angle of the crankshaft 26 is 30° CA after top dead center (ATDC) with respect to the compression top dead center of any of the cylinders #1 to #4 (S36). If the current rotation angle is 30° CA ATDC (S36: YES), the CPU 72 subtracts the time T30[0] from the time T30[6], and assigns the subtraction result to a rotation fluctuation amount ΔT30 (S38). The rotation fluctuation amount ΔT30 is a variable that is approximately 0 when a misfire is not occurring in the cylinder subject to the determination as to whether there is a misfire, and has a positive value when a misfire is occurring. The cylinder subject to the determination as to whether there is a misfire refers to a cylinder that has been determined to be 30° after the compression top dead center by the process of S36. However, the case in which that cylinder is the cylinder #1 is excluded.

The CPU 72 then determines whether the rotation fluctuation amount ΔT30, which has been calculated by the process of S38, is related to the cylinder #1 (S40). If the rotation fluctuation amount ΔT30, which has been calculated by the process of S38, is related to the cylinder #1 (S40: YES), the CPU 72 substitutes the rotation fluctuation amount ΔT30 for a reference value ΔT30ref (S42). Since the combustion operation is stopped in the cylinder #1, the rotation fluctuation amount ΔT30 has a value equivalent to that in a case in which a misfire is occurring.

On the other hand, when the rotation fluctuation amount ΔT30 calculated in the process of S38 is related to one of the cylinders #2 to #4 (S40: NO), the CPU 72 determines whether the absolute value of the difference between the rotation fluctuation amount ΔT30 and the reference value ΔT30ref is less than or equal to a determination value Δth (S44). This process determines whether a misfire has occurred in the cylinder subject to the determination as to whether there is a misfire. That is, the reference value ΔT30ref is equivalent to the rotation fluctuation amount ΔT30 in a case in which a misfire has occurred. Accordingly, when the degree of deviation between the rotation fluctuation amount ΔT30 and the reference value ΔT30ref is relatively small, the CPU 72 determines that a misfire is occurring in the cylinder subject to the determination. The determination value Δth is a fixed value that is defined previously.

When the absolute value of the difference between the rotation fluctuation amount ΔT30 and the reference value ΔT30ref is less than or equal to the determination value Δth (S44: YES), the CPU 72 increments a counter C (S46). When the process of S46 is completed or when making a negative determination in the process of S44, the CPU 72 determines whether a specified amount of time has elapsed from the later one of the point in time at which the process of S44 was executed for the first time and the point in time at which the process of S54, which will be discussed below, was executed (S48). When the specified amount of time has elapsed (S48: YES), the CPU 72 determines whether the counter C is greater than or equal to a threshold Cth (S50). The threshold Cth is set in accordance with the number of times a misfire occurs within the specified amount of time when a misfire is occurring at a frequency that cannot be ignored. When the counter C is greater than or equal to the threshold Cth (S50: YES), the CPU 72 determines that a misfire is occurring at a frequency that cannot be ignored. Then, the CPU 72 operates a warning lamp 100 shown in FIG. 1 to execute a notification process to inform the user of the occurrence of a misfire (S52).

In contrast, when the counter C is less than the threshold Cth (S50: NO), the CPU 72 initializes the counter C (S54).

When completing the process of S42, S52 or S54, or when making a negative determination in the process of S30, S36, or S48, the CPU 72 temporarily suspends the series of processes shown in FIG. 3.

Operation and advantages of the first embodiment will now be described.

The CPU 72 executes the regeneration process of the GPF 34 when the accumulated amount DPM is greater than or equal to a threshold DPMth. Accordingly, the air drawn into the cylinder #1 during the intake stroke is not consumed by combustion, but is discharged to the exhaust passage during the exhaust stroke of the cylinder #1. Also, the air-fuel mixture in the cylinders #2 to #4 is richer than the stoichiometric air-fuel ratio. Thus, the exhaust gas discharged to the exhaust passage 30 from the cylinders #2 to #4 contains a large amount of unburned fuel. Therefore, when oxygen and unburned fuel in the exhaust gas are burned in the three-way catalyst 32 and the like, the temperature of the GPF 34 is increased. Also, the oxygen in the air in the exhaust gas oxidizes the PM accumulated in the GPF 34. This burns and removes the PM.

During the execution of the regeneration process, the CPU 72 substitutes the rotation fluctuation amount ΔT30 related to the cylinder #1 for the reference value ΔT30ref. When the absolute value of the difference between the rotation fluctuation amount ΔT30 related to any of the cylinders #2 to #4 and the reference value ΔT30ref is less than or equal to the determination value Δth, the CPU 72 determines that a misfire has occurred.

Figure 4:
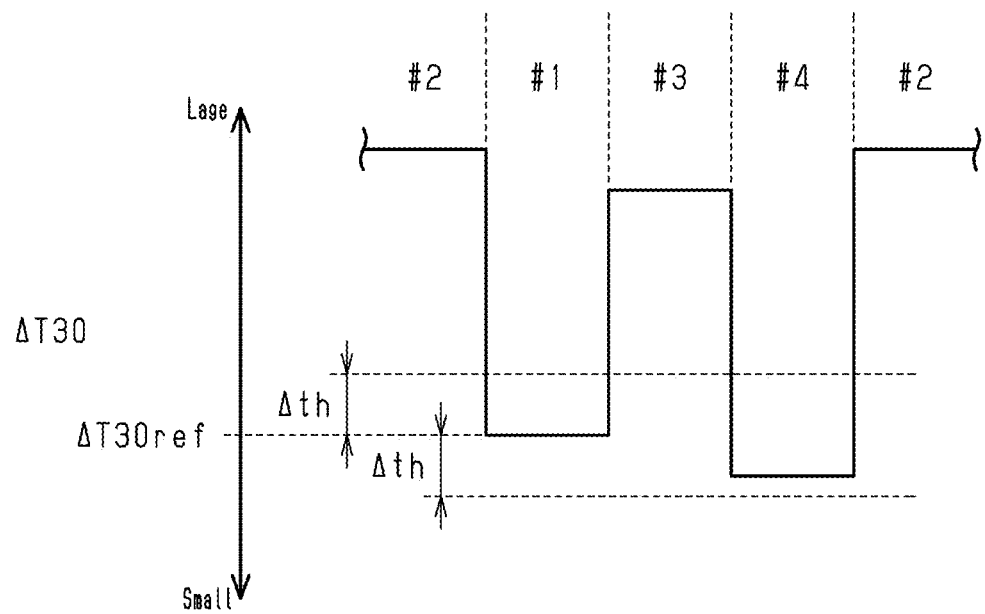
FIG. 4 is a timing diagram showing misfire determination.

FIG. 4 shows examples of movements of the rotation fluctuation amounts ΔT30 related to the cylinders #1 to #4.

In the example shown in FIG. 4, since the absolute value of the difference between the rotation fluctuation amount ΔT30 related to the cylinder #4 and the reference value ΔT30ref is less than or equal to the determination value Δth, the CPU 72 determines that a misfire has occurred in the cylinder #4. In contrast, since the rotation fluctuation amount ΔT30 related to the cylinder #3 and the rotation fluctuation amount ΔT30 related to the cylinder #2 are deviated from the reference value ΔT30ref by an amount greater than the determination value Δth, the CPU 72 determines that a misfire is not occurring in the cylinders #2, #3.

The first embodiment further has the following operation and advantages.

(1) The determination value Δth is a fixed value. The magnitude of the rotation fluctuation amount ΔT30 related to the cylinder subject to the determination as to whether there is a misfire changes in accordance with the load on the internal combustion engine 10 and the rotation speed NE. In contrast, the rotation fluctuation amount ΔT30 related to the cylinder in which the combustion operation is stopped corresponds to the load on the internal combustion engine 10 and the rotation speed NE. Accordingly, the reference value ΔT30ref is a variable corresponding to the load on the internal combustion engine 10 and the rotation speed NE. Thus, the first embodiment determines that there is a misfire when the amount of deviation between the rotation fluctuation amount $\Delta T30$ related to the cylinder in which combustion operation is being performed and the reference value $\Delta T30\text{ref}$ is less than or equal to the determination value $\Delta th$, so that whether there is a misfire is highly accurately determined even if the determination value $\Delta th$ is a fixed value. This reduces the number of adaptation steps related to the determination process for determining whether there is a misfire.

(2) The rotational energy of the crankshaft 26 is proportionate to the square of the rotation speed NE. Accordingly, the rate of change of the rotation speed NE in relation to the amount of energy supplied to the crankshaft 26 is higher when the rotation speed NE is relatively low than when the rotation speed NE is relatively high. Thus, in a low rotation speed region, a misfire may occur in the cylinder #3, in which the compression top dead center occurs subsequent to the cylinder #1, in which the combustion operation is stopped. In this case, a drop in the rotation speed NE may be greater than a drop in the rotation speed NE due to the combustion operation being stopped in the cylinder #1. In this regard, the first embodiment executes the regeneration process on condition that the rotation speed NE is greater than or equal to the defined speed NEth. This reduces a possible difference between the rotation fluctuation amount $\Delta T30$ related to the cylinder in which the combustion operation is stopped and the rotation fluctuation amount $\Delta T30$ related to the cylinder in which the combustion operation is performed. Thus, even though the determination value $\Delta th$ is a fixed value, whether there is a misfire is determined with a high accuracy.

(3) The CPU 72 executes the regeneration process on condition that the engine requested torque Te* is greater than or equal to the defined value Teth. The reduction in the accuracy of the misfire determination due to the influence of tolerances of the crank rotor 40 is less when the torque of the internal combustion engine 10 is relatively high than when the torque is relatively low. In this regard, the first embodiment executes the regeneration process when the engine requested torque Te* is greater than or equal to the defined value Teth. This reduces the reduction in the accuracy of the determination as to whether there is a misfire due to the influence of the tolerances, even if different teeth 42 are used to calculate the rotation fluctuation amount $\Delta T30$ related to the cylinder in which the combustion operation is stopped and the rotation fluctuation amount $\Delta T30$ related to the cylinder subject to the misfire determination. Thus, it is possible to determine whether there is a misfire with a high accuracy, even if different teeth 42 are used to calculate the rotation fluctuation amount $\Delta T30$ related to the cylinder in which the combustion operation is stopped and the rotation fluctuation amount $\Delta T30$ related to the cylinder subject to the misfire determination.

Second Embodiment

A second embodiment will now be described with reference to the drawings. The differences from the first embodiment will mainly be discussed.

Figure 5:
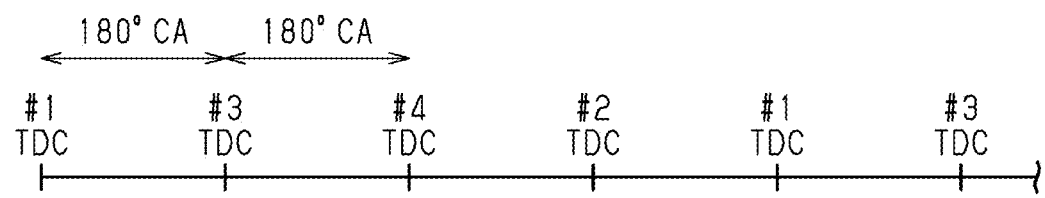
FIG. 5 is a timing diagram showing an order of occurrence of a compression top dead center according to a second embodiment.

FIG. 5 shows intervals between the compression top dead centers of cylinders according to the second embodiment. As shown in FIG. 5, in the second embodiment, the compression top dead center occurs in order of the cylinder #1, the cylinder #3, the cylinder #4, and the cylinder #2 at intervals of 180° CA. Thus, the compression top dead center of the cylinder #1 is displaced by 360° CA from the compression top dead center of the cylinder #4. This means that the tooth 42 of the crank rotor 40 used to calculate the rotation fluctuation amount $\Delta T30$ related to the cylinder #1 is the same as the tooth 42 of the crank rotor 40 used to calculate the rotation fluctuation amount $\Delta T30$ related to the cylinder #4. Accordingly, if there are tolerances in the spaces between the teeth 42, the influence of the tolerances on the rotation fluctuation amount $\Delta T30$ related to the cylinder #4 is the same as the influence of the tolerances on the rotation fluctuation amount $\Delta T30$ related to the cylinder #1.

In contrast, the tooth 42 used to calculate the rotation fluctuation amount $\Delta T30$ related to the cylinder #2 and the tooth 42 used to calculate the rotation fluctuation amount $\Delta T30$ related to the cylinder #3 are both different from the tooth 42 used to calculate the rotation fluctuation amount $\Delta T30$ related to the cylinder #1. Thus, the difference between the rotation fluctuation amount $\Delta T30$ in a case in which a misfire has occurred in the cylinder #2 and the rotation fluctuation amount $\Delta T30$ related to the cylinder #1 corresponds to the difference between the tolerances of these cylinders #1 and #2.

In this regard, the second embodiment learns the amount of displacement due to the difference in tolerances between the rotation fluctuation amounts $\Delta T30$ related to the cylinders #2, #3 and the rotation fluctuation amount $\Delta T30$ related to the cylinder #1.

Figure 6:
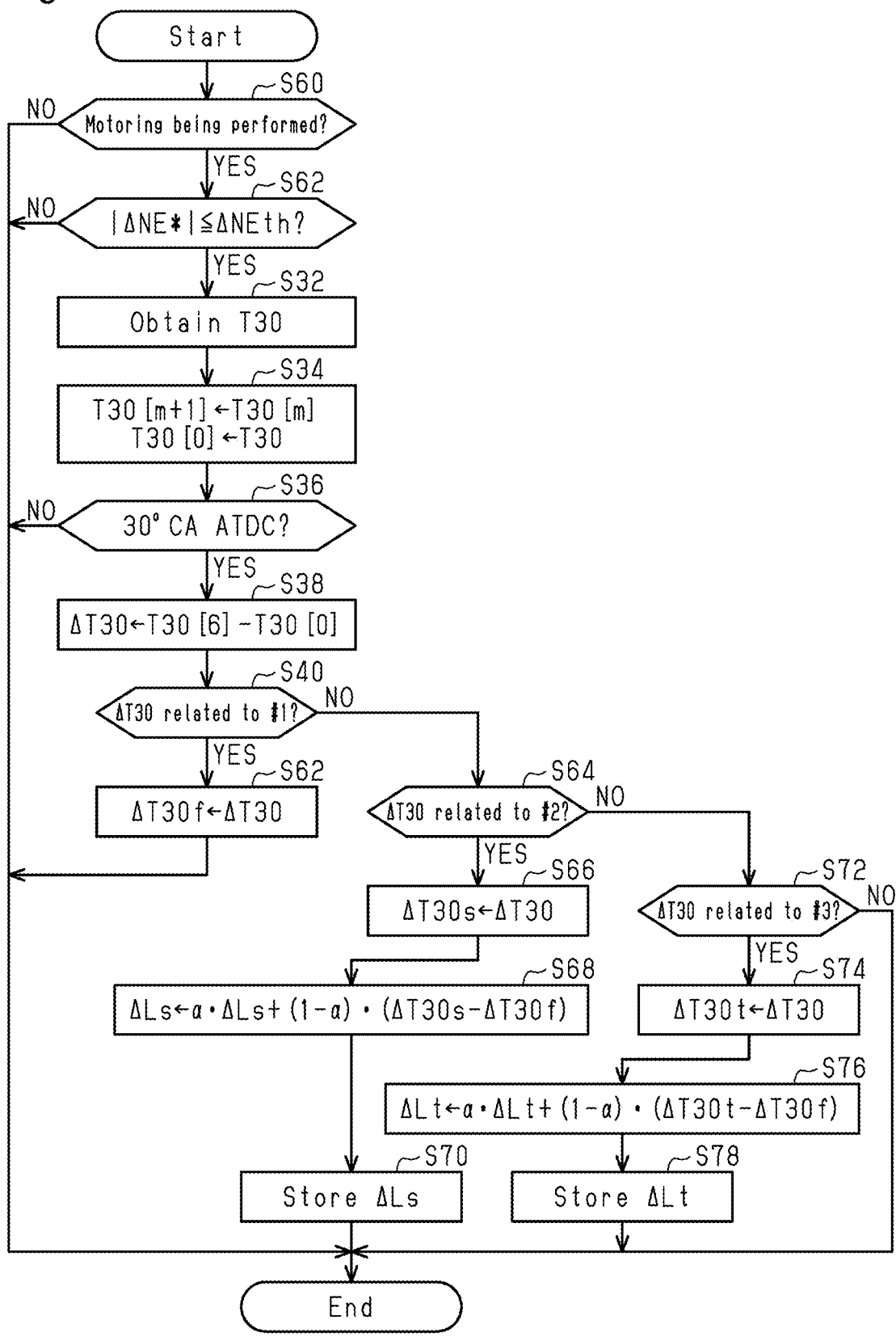
FIG. 6 is a flowchart showing a procedure of processes executed by the controller.

FIG. 6 shows a procedure of processes related to the learning. The process shown in FIG. 6 is implemented by the CPU 72 repeatedly executing programs stored in the ROM 74.

In the series of processes shown in FIG. 6, the CPU 72 first determines whether motoring is being performed, in which combustion operation is stopped in all the cylinders of the internal combustion engine 10, and the crankshaft 26 is rotated by the rotational force of the carrier C (S60). When the internal combustion engine 10 is performing motoring (S60: YES), the CPU 72 determines whether the absolute value of an amount of change $\Delta NE^*$ per unit time of an engine speed command value NE*, which is a command value for the rotation speed NE, is less than or equal to a defined amount $\Delta NEth$ (S62). The rotational frequency of the crankshaft 26 includes low-frequency components having periods longer than one revolution of the crankshaft 26, and the defined amount $\Delta NEth$ is set based on the amount of change of the rotation speed NE in a case in which those low-frequency components are sufficiently small.

When the absolute value of the amount of change $\Delta NE^*$ is less than or equal to the defined amount $\Delta NEth$ (S62: YES), CPU 72 executes the same process as the process of S32 to S40 in FIG. 3. If the rotation fluctuation amount $\Delta T30$, which has been calculated by the process of S38, is related to the cylinder #1 (S40: YES), the CPU 72 substitutes the rotation fluctuation amount $\Delta T30$ for a first rotation fluctuation amount $\Delta T30f$ (S62).

When the rotation fluctuation amount $\Delta T30$ calculated in the process of S38 is related to any of the cylinders #2 to #4 (S40: NO), the CPU 72 determines whether the calculated rotation fluctuation amount $\Delta T30$ is related to the cylinder #2 (S64). If the calculated rotation fluctuation amount $\Delta T30$ is related to the cylinder #2 (S64: YES), the CPU 72 substitutes the rotation fluctuation amount $\Delta T30$ for a second rotation fluctuation amount $\Delta T30s$ (S66). Then, the CPU 72 subtracts the first rotation fluctuation amount $\Delta T30f$ from the second rotation fluctuation amount $\Delta T30s$ and performs a process for obtaining an exponential moving average of the subtraction result in order to calculate a second learning value ΔLs (S68). That is, the CPU 72 multiplies the second learning value ΔLs by a factor α, which is greater than 0 and less than 1. The CPU 72 then subtracts the first rotation fluctuation amount ΔT30f from the second rotation fluctuation amount ΔT30s and multiplies the subtraction result by (1−α). The CPU 72 substitutes the sum of the products for the second learning value ΔLs. The CPU 72 stores the second learning value ΔLs in the memory device 75 (S70).

When the rotation fluctuation amount ΔT30 calculated in the process of S38 is related to the cylinder #3 or the cylinder #4 (S64: NO), the CPU 72 determines whether the calculated rotation fluctuation amount ΔT30 is related to the cylinder #3 (S72). If the calculated rotation fluctuation amount ΔT30 is related to the cylinder #3 (S72: YES), the CPU 72 substitutes the rotation fluctuation amount ΔT30 for a third rotation fluctuation amount ΔT30t (S74). Then CPU 72 subtracts the first rotation fluctuation amount ΔT30 from the third rotation fluctuation amount ΔT30t and performs a process for obtaining an exponential moving average of the subtraction result in order to calculate a third learning value ΔLt (S76). That is, the CPU 72 multiplies the third learning value ΔLt by a factor α, which is greater than 0 and less than 1. The CPU 72 then subtracts the first rotation fluctuation amount ΔT30f from the third rotation fluctuation amount ΔT30t and multiplies the subtraction result by (1−α). The CPU 72 substitutes the sum of the products for the third learning value ΔLt. The CPU 72 stores the third learning value ΔLt in the memory device 75 (S78).

When completing the process of S62, S70 or S78, or when making a negative determination in the process of S60, S62, S36 or S72, the CPU 72 temporarily suspends the series of processes shown in FIG. 6.

Figure 7:
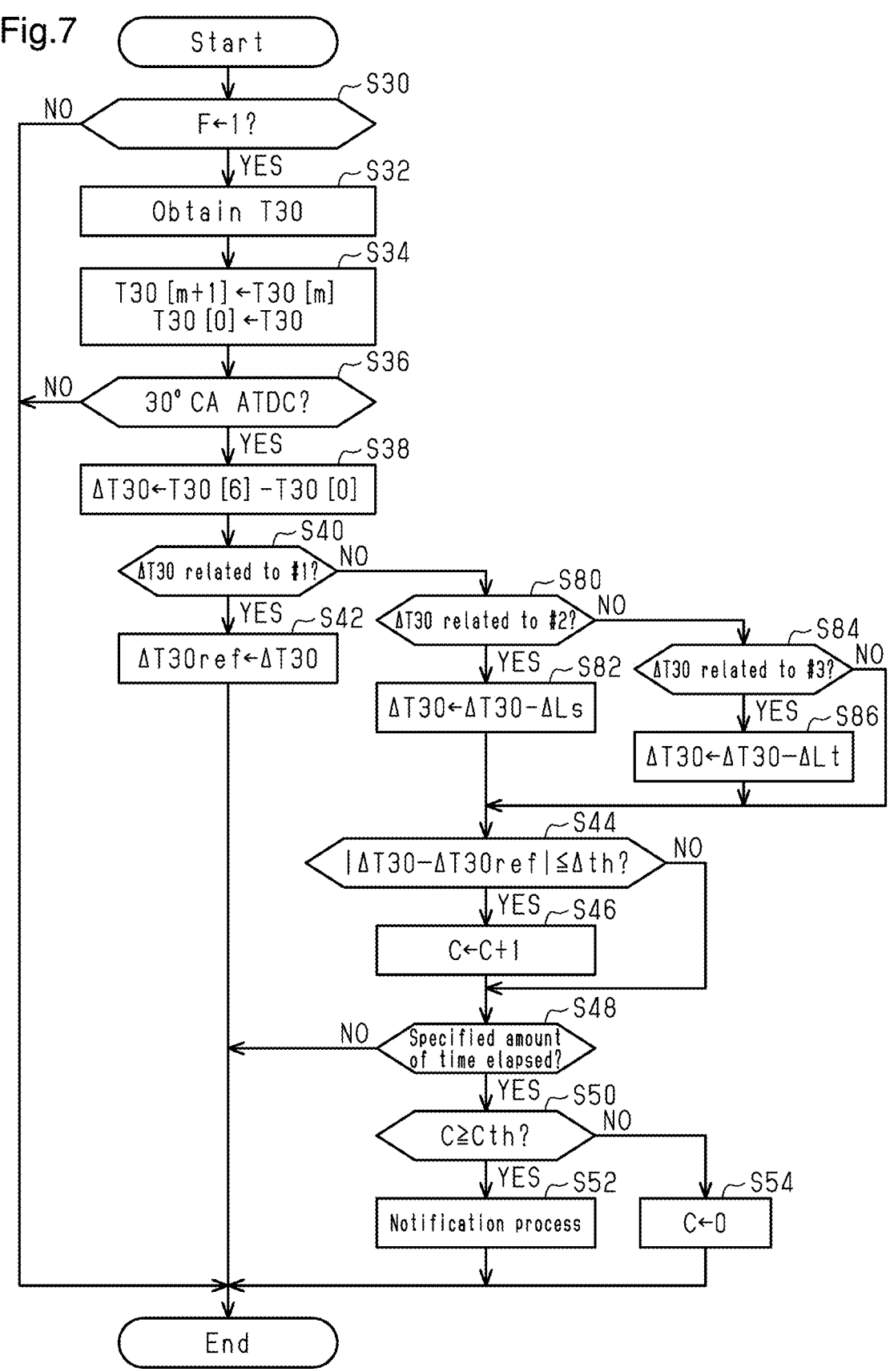
FIG. 7 is a flowchart showing a procedure of processes executed by the controller.

FIG. 7 is a flowchart showing a procedure of processes related to determination as to whether there is a misfire according to the second embodiment. The process shown in FIG. 7 is implemented by the CPU 72 repeatedly executing programs stored in the ROM 74 at specified intervals. In FIG. 7, the same step numbers are given to the processes that correspond to those in FIG. 3.

In the series of processes shown in FIG. 7, when making a negative determination in the process of S40, the CPU 72 determines whether the rotation fluctuation amount ΔT30, which has been calculated by the process of S38, is related to the cylinder #2 (S80). If the calculated rotation fluctuation amount ΔT30 is related to the cylinder #2 (S80: YES), the CPU 72 subtracts the second learning value ΔLs from the rotation fluctuation amount ΔT30, and updates the rotation fluctuation amount ΔT30 to the subtraction result (S82).

When the calculated rotation fluctuation amount ΔT30 is not related to the cylinder #2 (S80: NO), the CPU 72 determines whether the rotation fluctuation amount ΔT30 calculated in the process of S38 is related to the cylinder #3 (S84). If the calculated rotation fluctuation amount ΔT30 is related to the cylinder #3 (S84: YES), the CPU 72 subtracts the third learning value ΔLt from the rotation fluctuation amount ΔT30, and updates the rotation fluctuation amount ΔT30 to the subtraction result (S86).

When completing the process of S82 or S86, or when making a negative determination in the process of S84, the CPU 72 proceeds to the process of S44.

As described above, when the cylinder #2 or the cylinder #3 is subject to the misfire determination, the second embodiment changes the upper limit of the degree of deviation between the reference value ΔT30ref and the rotation fluctuation amount ΔT30 related to the cylinder subject to the determination. The deviation is used to determine whether there is a misfire.

Figure 8:
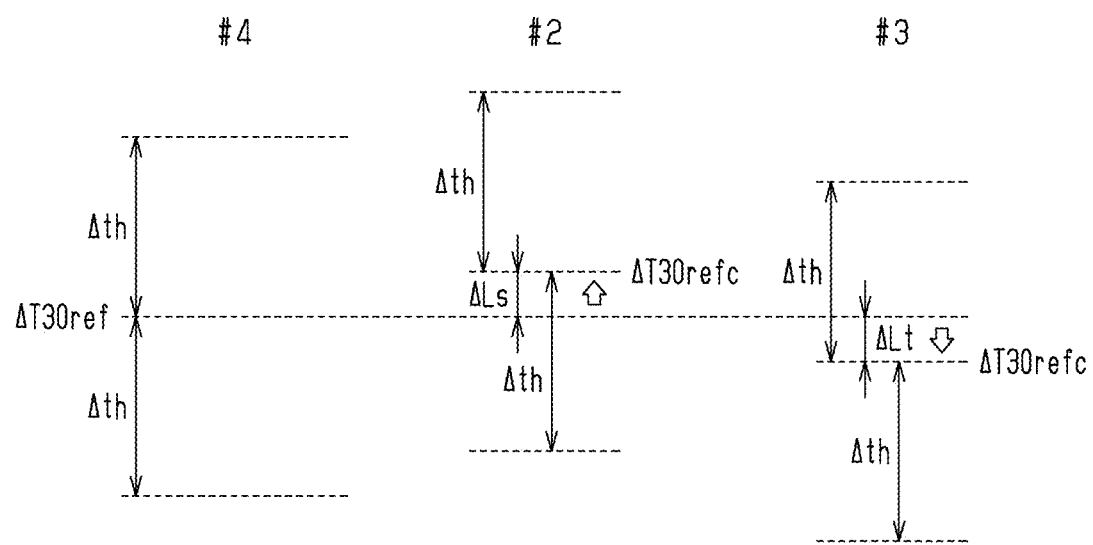
FIG. 8 is a diagram showing a correction process of a deviation amount.

FIG. 8 shows the regions of the rotation fluctuation amount ΔT30 when it is determined that there is a misfire in the cylinders #2 to #4.

As shown in FIG. 8, as for the cylinder #4, the region in which the difference between the rotation fluctuation amount ΔT30 and the reference value ΔT30ref is less than or equal to the determination value Δth is a region in which it is determined that there is a misfire. As for the cylinder #2, an example is illustrated in which the second learning value ΔLs has a positive value. In this case, a region in which the amount by which the rotation fluctuation amount ΔT30 exceeds the reference value ΔT30ref is less than or equal to (Δth+ΔLs), and the amount by which the rotation fluctuation amount ΔT30 falls below the reference value ΔT30ref is less than or equal to (−Δth+ΔLs), is a region in which it is determined that there is a misfire. This region can be regarded as a region in which the difference between the rotation fluctuation amount ΔT30 and a corrected value ΔT30refc, which is obtained by increasing the reference value ΔT30ref by the second learning value ΔLs, is less than or equal to the determination value Δth.

Also, as for the cylinder #3, an example is illustrated in which the third learning value ΔLt has a negative value. In this case, a region in which the amount by which the rotation fluctuation amount ΔT30 exceeds the reference value ΔT30ref is less than or equal to (Δth−|ΔLs|), and the amount by which the rotation fluctuation amount ΔT30 falls below the reference value ΔT30ref is less than or equal to (−Δth−|ΔLs|), is a region in which it is determined that there is a misfire. This region can be regarded as a region in which the difference between the rotation fluctuation amount ΔT30 and a corrected value ΔT30refc, which is obtained by reducing the reference value ΔT30ref by the absolute value of the third learning value ΔLt, is less than or equal to the determination value Δth.

Accordingly, the accuracy of the determination as to whether there is a misfire in the cylinders #2, #3 is unlikely to be reduced due to tolerances, as compared to the accuracy of the determination as to whether there is a misfire in the cylinder #4.

Third Embodiment

A third embodiment will now be described with reference to the drawings. The differences from the first embodiment will mainly be discussed.

Instead of using the rotation fluctuation amount ΔT30 as the combustion variable for detecting a misfire, the third embodiment quantifies the combustion variable using the in-cylinder pressure Pc.

FIG. 9 is a flowchart showing a procedure of processes related to determination as to whether there is a misfire according to the third embodiment. The process shown in FIG. 9 is implemented by the CPU 72 repeatedly executing programs stored in the ROM 74 at specified intervals. In FIG. 9, the same step numbers are given to the processes that correspond to those in FIG. 3.

In the series of processes shown in FIG. 9, the CPU 72 first determines whether the flag F is 1 (S90). When the flag F is 1 (S90: YES), the CPU 72 determines whether the current rotation angle of the crankshaft 26 corresponds to the compression top dead center of any of the cylinders #1 to #4 (S92). If the current rotation angle of the crankshaft 26 corresponds to the compression top dead center of any of the cylinders #1 to #4 (S92: YES), the CPU 72 acquires the in-cylinder pressure Pc (S94). Then, the CPU 72 adds the in-cylinder pressure Pc to an in-cylinder pressure accumulated value InPc in order to update the in-cylinder pressure accumulated value InPc (S96). The CPU 72 continues the processes of S94 and S96 over an angular interval of 120° CA (S98: NO).

When the current rotation angle of the crankshaft 26 reaches 120° CA ATDC (S98: YES), the CPU 72 determines whether the in-cylinder pressure accumulated value InPc is the amount corresponding to the cylinder #1 (S40a). If the in-cylinder pressure accumulated value InPc is the amount corresponding to the cylinder #1 (S40a: YES), the CPU 72 substitutes the in-cylinder pressure accumulated value InPc for a reference value InPcref (S42a).

In contrast, when the calculated in-cylinder pressure accumulated value InPc is the amount corresponding to any of the cylinders #2 to #4 (S40a: NO), the CPU 72 determines whether the absolute value of the difference between the in-cylinder pressure accumulated value InPc and the reference value InPcref is less than or equal to the determination value $\Delta th$ (S44a). The reference value InPcref is an accumulated value of the in-cylinder pressure Pc during a period in which the combustion operation is stopped. Thus, the reference value InPcref is relatively small since no combustion energy is generated in that period. The reference value InPcref is equivalent to the in-cylinder pressure accumulated value InPc at the time when a misfire has occurred. Thus, when the absolute value of the difference between the in-cylinder pressure accumulated value InPc and the reference value InPcref is less than or equal to the determination value $\Delta th$ (S44a: YES), the CPU 72 determines that a misfire has occurred in the cylinder subject to the determination, and proceeds to the process of S46. When the absolute value of the difference between the in-cylinder pressure accumulated value InPc and the reference value InPcref exceeds the determination value $\Delta th$ (S44a: NO), the CPU 72 proceeds to the process of S48.

The determination value $\Delta th$ is a fixed value that is defined previously. That is, the in-cylinder pressure accumulated value InPc in a case in which a misfire has occurred and the in-cylinder pressure accumulated value InPc in a case in which a misfire is not occurring both fluctuate due to the rotation speed NEa and the charging efficiency $\eta$. However, such fluctuation is reflected on the reference value InPcref. Accordingly, the determination as to whether there is a misfire based on the degree of deviation from the reference value InPcref reduces the number of adaptation steps for the determination value.

<Correspondence>

The correspondence between the items in the above-described embodiments and the items the WHAT IS CLAIMED IS section is as follows. Below, the correspondence is shown for each claim number. [1] The stopping process corresponds to the process of S22. The combustion variable corresponds to the rotation fluctuation amount $\Delta T30$ in FIGS. 3 and 7, and to the in-cylinder pressure accumulated value InPc in FIG. 9. The combustion variable obtaining process corresponds to the process of S38 and the process of S96. The determination process corresponds to the process of S44 and the process of S44a. [2] The instantaneous speed variable corresponds to the T30. [3] The defined amount corresponds to the determination value $\Delta th$ in FIGS. 3 and 9, and to $\Delta th+\Delta Ls$, $\Delta th-\Delta Ls$, $\Delta th+\Delta Lt$, and $\Delta th-\Delta Lt$ in FIG. 7. [4, 5] claims 4 and 5 correspond to the process of S20. [6] The learning process corresponds to the processes of S68 and S76. The correcting process corresponds to the processes of S82 and S86. [7, 8] The sensor corresponds to the in-cylinder pressure sensor 89.

OTHER EMBODIMENTS

The above-described embodiments may be modified as follows. The above-described embodiments and the following modifications can be combined as long as the combined modifications remain technically consistent with each other.

Modification Related to Rotation Fluctuation Amount

The rotation fluctuation amount $\Delta T30$ does not necessarily need to be a value obtained by subtracting, from the time T30 required by rotation from TDC to 30 ATDC in the cylinder subject to the misfire determination, the time T30 required by rotation from TDC to 30 ATDC in the cylinder in which the compression top dead center occurred immediately before the cylinder subjected to the determination. For example, the rotation fluctuation amount $\Delta T30$ may be a value obtained by subtracting, from the time T30 required by rotation from 90 ATDC to 120 ATDC in the cylinder subject to the misfire determination, the time T30 required by rotation from TDC to 30 ATDC in the same cylinder.

In the above-described embodiments, the rotation fluctuation amount, which is the amount of fluctuation of the rotation speed of the crankshaft 26 in a rotation angle range less than or equal to the interval between the occurrences of the compression top dead center, is quantified using the difference between the amounts of time required by the crankshaft 26 to rotate the rotation angle range. However, the rotation fluctuation amount may be quantified using the ratio of the amounts of time.

The instantaneous speed variable, which is used to determine the rotation fluctuation amount and represents the rotation speed of the crankshaft 26 within an angular interval less than or equal to the interval between the occurrences of the compression top dead center, is not limited to a variable that represents the rotation speed of the crankshaft 26 in a range of 30° CA. For example, the instantaneous speed variable may be a variable representing the rotation speed of the crankshaft 26 in a range of 180° CA.

In the above-described embodiments, the instantaneous speed variable is used, which represents the rotation speed of the crankshaft 26 within an angular interval less than or equal to the interval between the occurrences of the compression top dead center for determining the rotation fluctuation amount. The instantaneous speed variable is quantified using the amount of time required by the crankshaft 26 to rotate the angular interval. However, the instantaneous speed variable may be quantified using the speed.

Modification Related to Execution Condition for Regeneration Process

The condition for executing the regeneration process does not necessarily need to include both the condition (1) and the condition (2). For example, the execution condition may include only one of the condition (1) and the condition (2). Alternatively, the execution condition does not necessarily include these two conditions.

Modification Related to Defined Amount, or Upper Limit of Deviation Amount for Determining Misfire In the above-described embodiments, the determination value $\Delta th$, which is used to determine the defined amount, is a fixed value. However, the present disclosure is not limited to this. Particularly, as described in the section of Modification related to Execution Condition for Regeneration Process, the regeneration process may be executed at low rotation speeds, without using the condition (2) as the execution condition for the regeneration process. In this case, if a misfire occurs in a cylinder in which the compression top dead center occurs subsequent to the cylinder #1, in which the combustion operation is stopped, the rotation fluctuation amount ΔT30 tends to be larger than the rotation fluctuation amount ΔT30 related to the cylinder #1. Accordingly, the determination value Δth may be varied in accordance with the rotation speed NE.

Modification Related to Learning Process

In the above-described embodiments, the second leaning value ΔLs and the third learning value ΔLt are calculated by performing a process for obtaining an exponential moving average of the rotation fluctuation amount ΔT30. However, the present disclosure is not limited to this. The second learning value ΔLs and the third learning value ΔLt may be calculated through a process for obtaining a simple moving average. However, the process for obtaining a moving average does not necessarily need to be performed. For example, the latest values of the second rotation fluctuation amount ΔT30s and the third rotation fluctuation amount ΔT30t, which are calculated by the processes of S66 and S74, may be respectively used as the second learning value ΔLs and the third learning value ΔLt.

Modification Related to Correction of Deviation Amount Between Reference Value and Rotation Fluctuation Amount Related to Cylinder Subject to Determination In the processes of S82 and S86, the second learning value ΔLs and the third learning value ΔLt are respectively subtracted from the rotation fluctuation amount ΔT30 related to the cylinder subject to the determination. However, the present disclosure is not limited to this. For example, the second learning value ΔLs or the third learning value ΔLt may be added to the reference value ΔT30ref.

The section of Modification related to Defined Amount illustrates an example in which the determination value 4th is varied in accordance with the rotation speed in a low rotation speed region. However, the present disclosure is not limited to this. For example, the reference value ΔT30ref may be corrected in the low rotation speed region.

Modification Related to Sensor Provided in Combustion Chamber to Detect Combustion State The above-described embodiments use an in-cylinder pressure sensor as a sensor for detecting the combustion state. However, the present disclosure is not limited this. For example, a sensor that detects ion current may be employed. Even in this case, the threshold for determining a misfire fluctuates in accordance with the operating state of the internal combustion engine due to the influences of noise. It is thus effective to set a reference value to a detected value of ion current in the cylinder in which the combustion operation is stopped. Further, instead of an ion current sensor, a light-sensitive sensor may be used that detects light to detect the combustion state in the combustion chamber.

Modification Related to Combustion Variable

The combustion variable, which is calculated using the output signal Scr of the crank angle sensor 82 as an input, is not limited to a rotation fluctuation amount. For example, the average of the shaft torque of the internal combustion engine 10 in a specified period of time may be used. The average of the shaft torque can be calculated, for example, using the following expression (c1).

$$Te = Ie \cdot d\omega e + (1+\rho)/\{\rho \cdot (Ig1 \cdot d\omega m1 - Tr)\} \quad (c1)$$

The expression (c1) uses a shaft torque Te, a rate of change dωe of an instantaneous speed we of the internal combustion engine 10, which is calculated from the reciprocal of the time T30, a moment of inertia Ie of the internal combustion engine 10, a moment of inertia Ig1 of the first motor-generator 52, an angular acceleration dωm1 of the first motor-generator 52, a reaction torque Tr of the first motor-generator 52, and a planetary gear ratio ρ of the planetary gear mechanism 50. The above-described specified period is less than or equal to the interval between the occurrences of the compression top dead center.

In the process shown in FIG. 9, the in-cylinder pressure accumulated value InPc is used as the combustion variable calculated using the detected value of the in-cylinder pressure sensor 89. However, the present disclosure is not limited to this. For example, the maximum value of the in-cylinder pressure Pc may be used. Alternatively, the amount of combustion energy may be used.

When an ion current sensor is used as described in the section of Modification related to Sensor that is provided in Combustion Chamber to detect Combustion State, the combustion variable may include an accumulated value of ion current.

Modification Related to Stopping Process

The stopping process is not limited to the regeneration process. For example, the stopping process may be configured to stop supply of fuel to one or some of the cylinders in order to adjust the output of the internal combustion engine 10. Also, the stopping process may be configured to stop the combustion operation in one or some of the cylinders in which an anomaly has occurred. Alternatively, when the oxygen storage amount of the three-way catalyst 32 is less than or equal to a defined value, the stopping process may be configured to stop the combustion operation in one or some of the cylinders in order to supply oxygen to the three-way catalyst 32, and set the air-fuel ratio of the air-fuel mixture in the remaining cylinders to the stoichiometric air-fuel ratio.

Modification Related to Reflection of Result of Misfire Determination

In the above-described embodiments, the notification process is executed using the warning lamp 100 when it is determined that a misfire has occurred. However, the present disclosure is not limited to this. The notification process is not limited to a process that operates a device outputting visual information, but may be configured to operate a device outputting audio information.

The result of the misfire determination does not necessarily need to be used in the notification process. For example, when a misfire occurs, a process may be executed that operates an operated unit of the internal combustion engine 10 to switch the control of the internal combustion engine 10 to an operating state that is less likely to cause a misfire to occur. That is, the hardware means that is operated to deal with the result of the misfire determination is not limited to a notification device, but may be an operated unit of the internal combustion engine 10 or the like.

Modification Related to Estimation of Accumulated Amount

A process for estimating the accumulated amount DPM is not limited to that illustrated in FIG. 2. The accumulated amount DPM may be estimated based on the intake air amount Ga and the pressure difference between the upstream side and the downstream side of the GPF 34. Specifically, the accumulated amount DPM may be estimated to be larger when the pressure difference is relatively large than when the pressure difference is relatively small. Also, even if the pressure difference is the same, the accumulated amount DPM may be estimated to be larger when the intake air amount Ga is relatively small than when the intake air amount Ga is relatively large. In a case in which the pressure on the downstream side of the GPF 34 is regarded to be constant, the above-described pressure Pex can be used in place of the pressure difference.

Modification Related to Aftertreatment Device

The GPF 34 is not limited to a filter supporting a three-way catalyst, but may be a simple filter. The GPF 34 does not necessarily need to be placed on the downstream side of the three-way catalyst 32 in the exhaust passage 30. Also, the aftertreatment device does not necessarily need to include the GPF 34. For example, the aftertreatment device may include only the three-way catalyst 32. Even in this case, when oxygen is supplied to the three-way catalyst 32 by stopping the combustion operation in one or some of the cylinders as illustrated in the section of Modification related to Stopping Process, it is effective to execute the processes described in the above-described embodiments and the modifications thereof Modification Related to Controller The controller is not limited to a device that includes the CPU 72 and the ROM 74 and executes software processing. For example, at least part of the processes executed by the software in the above-described embodiments may be executed by hardware circuits dedicated to executing these processes (such as an application-specific integrated circuit (ASIC)). That is, the controller may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. Multiple software processing devices each including a processor and a program storage device and multiple dedicated hardware circuits may be provided.

Modification Related to Vehicle

The vehicle is not limited to a series-parallel hybrid vehicle, but may be a parallel hybrid vehicle or a series hybrid vehicle. Further, the vehicle is not limited to a hybrid electric vehicle, but may be a vehicle that includes only the internal combustion engine 10 as a driver force generator.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A misfire detecting device for an internal combustion engine, the internal combustion engine including cylinders, the misfire detecting device being configured to execute:

a stopping process that stops a combustion operation for air-fuel mixture in a cylinder subject to the stopping process among the cylinders;

a combustion variable obtaining process that obtains values of a combustion variable, the combustion variable being determined by a detected value of a sensor that detects physical quantities corresponding to combustion states of air-fuel mixture in the respective cylinders, and the combustion variable representing the combustion state in each of the respective cylinders; and a determination process that when the stopping process is executed, defines one of cylinders in which the combustion operation is performed as a cylinder subject to misfire determination as to whether there is a misfire, sets, as a reference value, the value of the combustion variable of the cylinder subject to the stopping process, the reference value not reflecting the values of the combustion variable of the cylinders in which the combustion operation is performed, and determines that a misfire has occurred in the cylinder subject to the misfire determination in response to a degree of deviation of the value of the combustion variable of the cylinder subject to the misfire determination in relation to the reference value being less than or equal to a specified value.

2. The misfire detecting device for the internal combustion engine according to claim 1, wherein the sensor is a crank angle sensor, the combustion variable is a rotation fluctuation amount of a crankshaft of the internal combustion engine, the rotation fluctuation amount is a variable related to a difference in magnitude of instantaneous speed variables, the instantaneous speed variables each represent a rotation speed of the crankshaft within an angular interval less than or equal to an interval between occurrences of a compression top dead center of the internal combustion engine, and the instantaneous speed variables corresponding to the rotation fluctuation amount of a specific cylinder of the cylinders include an instantaneous speed variable in a period between a compression top dead center of the specific cylinder and a subsequent compression top dead center.

3. The misfire detecting device for the internal combustion engine according to claim 2, wherein the determination process determines that a misfire has occurred in the cylinder subject to the misfire determination in response to a deviation amount of the rotation fluctuation amount of the cylinder subject to the misfire determination in relation to the rotation fluctuation amount of the cylinder subject to the stopping process being less than or equal to a defined amount that is defined previously, and the defined amount is a fixed value.

4. The misfire detecting device for the internal combustion engine according to claim 3, wherein the misfire detecting device is configured to execute the stopping process on a condition that the rotation speed of the crankshaft of the internal combustion engine is greater than or equal to a defined speed.

5. The misfire detecting device for the internal combustion engine according to claim 3, wherein the misfire detecting device is configured to execute the stopping process on a condition that a torque of the internal combustion engine is greater than or equal to a defined value.

6. The misfire detecting device for the internal combustion engine according to claim 2, wherein the misfire detecting device is configured to execute a learning process, the learning process learning a difference between
- a rotation fluctuation amount in a case in which the combustion operation of the internal combustion engine is stopped in a cylinder of which an interval of an occurrence of the compression top dead center from an occurrence of the compression top dead center of the cylinder subject to the stopping process is not an integral multiple of one revolution, and
- the rotation fluctuation amount of the cylinder subject to the stopping process, and the determination process includes a correction process that
- determines that a misfire has occurred in the cylinder subject to the misfire determination in response to a deviation amount of the rotation fluctuation amount of the cylinder subject to the misfire determination in relation to the rotation fluctuation amount of the cylinder subject to the stopping process being less than or equal to a defined amount that is defined previously, and
- defines, in accordance with the difference learned by the learning process, the defined amount for a case in which the misfire determination is performed on the cylinder of which the interval is not an integral multiple of one revolution.

7. The misfire detecting device for the internal combustion engine according to claim 1, wherein
the sensor includes sensors that are respectively provided in combustion chambers of the cylinders to detect combustion states of air-fuel mixture in the combustion chambers, and
the combustion variable related to each of the cylinders includes a variable that is quantified using detected values of the sensors in a period from a compression top dead center to a subsequent compression top dead center in the cylinders.

8. The misfire detecting device for the internal combustion engine according to claim 7, wherein the sensors include sensors that detect pressure in the combustion chambers.

9. A misfire detecting device for an internal combustion engine, the internal combustion engine including cylinders, the misfire detecting device including circuitry, wherein the circuitry is configured to execute:
a stopping process that stops a combustion operation for air-fuel mixture in a cylinder subject to the stopping process among the cylinders;
a combustion variable obtaining process that obtains values of a combustion variable, the combustion variable being determined by a detected value of a sensor that detects physical quantities corresponding to combustion states of air-fuel mixture in the respective cylinders, and the combustion variable representing the combustion state in each of the respective cylinders; and
a determination process that
when the stopping process is executed, defines one of cylinders in which the combustion operation is performed as a cylinder subject to misfire determination as to whether there is a misfire,
sets, as a reference value, the value of the combustion variable of the cylinder subject to the stopping process, the reference value not reflecting the values of the combustion variable of the cylinders in which the combustion operation is performed, and
determines that a misfire has occurred in the cylinder subject to the misfire determination in response to a degree of deviation of the value of the combustion variable of the cylinder subject to the misfire determination in relation to the reference value being less than or equal to a specified value.

10. A misfire detecting method for an internal combustion engine, the internal combustion engine including cylinders, the misfire detecting method comprising:
stopping a combustion operation for air-fuel mixture in a cylinder subject to the stopping process among the cylinders;
obtaining values of a combustion variable, the combustion variable being determined by a detected value of a sensor that detects physical quantities corresponding to combustion states of air-fuel mixture in the respective cylinders, and the combustion variable representing the combustion state in each of the respective cylinders; and
determining that includes
when the stopping process is executed, defining one of cylinders in which the combustion operation is performed as a cylinder subject to misfire determination as to whether there is a misfire,
sets, as a reference value, the value of the combustion variable of the cylinder subject to the stopping process, the reference value not reflecting the values of the combustion variable of the cylinders in which the combustion operation is performed, and
determining that a misfire has occurred in the cylinder subject to the misfire determination in response to a degree of deviation of the value of the combustion variable of the cylinder subject to the misfire determination in relation to the reference value being less than or equal to a specified value.

11. The misfire detecting device for the internal combustion engine according to claim 1, wherein
the sensor is a crank angle sensor,
the combustion variable is a rotation fluctuation amount of a crankshaft of the internal combustion engine, and
the misfire detecting device is configured to execute the determination process that sets, as the reference value, the rotation fluctuation amount related to the cylinder subject to the stopping process.

12. The misfire detecting device for the internal combustion engine according to claim 1, wherein
the sensor includes sensors that are respectively provided in combustion chambers of the cylinders to detect a pressure, as the combustion variable, in each of the combustion chambers, and
the misfire detecting device is configured to execute the determination process that sets, as the reference value, an accumulated value of the pressure in the combustion chamber of the cylinder subject to the stopping process.

* * * * *